Aug. 16, 1966 YONGKO PAK 3,266,374
GEAR GENERATOR AND GRINDER
Filed March 31, 1964 3 Sheets-Sheet 1

INVENTOR.
YONGKO PAK
BY *Emery Whittemore*
*Sandoe & Graham*
ATTORNEYS

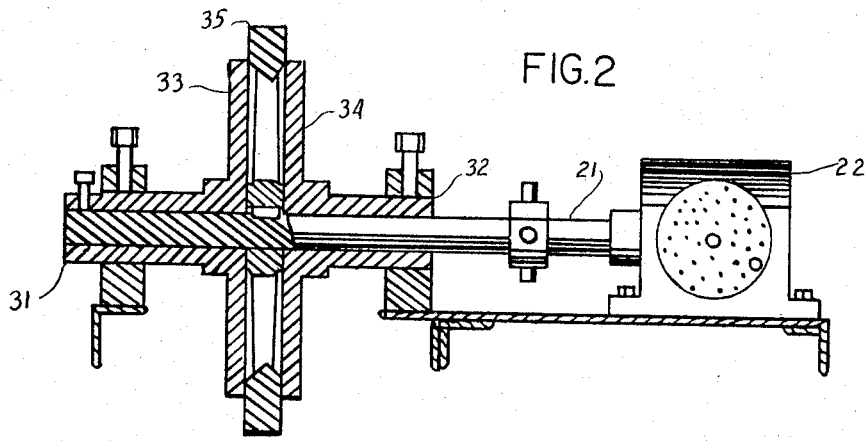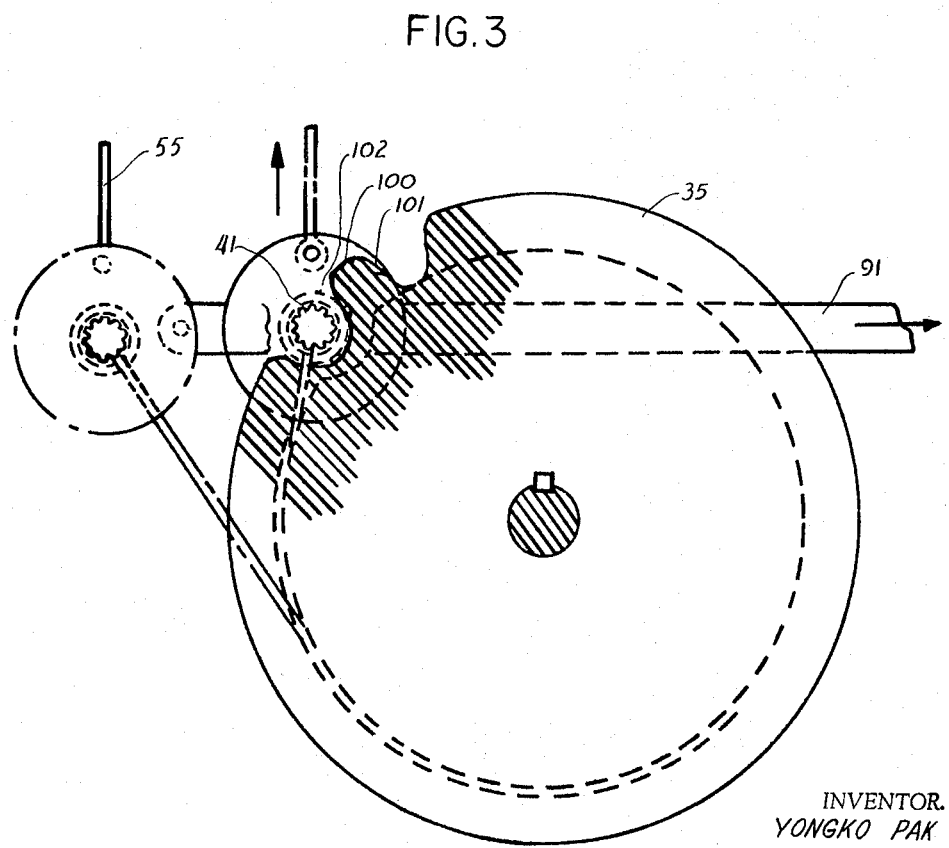

$$r = a\sqrt{1+\theta^2} \quad \therefore r^2 = a^2 + a^2\theta^2$$
$$\phi = \theta - \angle PoB$$
$$\phi = \sqrt{\frac{r^2}{a^2}-1} - \arctan\sqrt{\frac{r^2}{a^2}-1}$$

$P(x,y)$
$x = a(\cos\theta + \theta\cdot\sin\theta)$
$y = a(\sin\theta - \theta\cdot\cos\theta)$

INVENTOR.
YONGKO PAK

ATTORNEYS

United States Patent Office

3,266,374
Patented August 16, 1966

3,266,374
GEAR GENERATOR AND GRINDER
Yongko Pak, 14 Shinhungdong, Chinhae, Korea
Filed Mar. 31, 1964, Ser. No. 356,125
5 Claims. (Cl. 90—3)

This invention relates to a machine tool and particularly to a rather simple but versatile device for use in cutting and grinding special gears.

It is understood that a gear tooth must be of involute curved form and the technology of cutting and grinding gears is highly developed. However, for many purposes, it is important to have available a machine readily adaptable to cutting gears of different sizes and yet to keep the gear teeth accurate both with respect to shape and size. That is, conventional techniques of cutting gears involve a sequence of machine tools including gear shapers, hobbing machines, etc., which with all their efficiency are themselves geared to cut only specific sizes of gears by means of specific gear cutters and ratios.

It is accordingly a fundamental object of this invention to provide a simple gear cutting machine adapted to cut with a considerable degree of precision gear teeth on a circular disk, thereby to develop a form suitable for most gears.

It is another object of the invention to provide a gear cutting machine tool wherein the tool bit follows an involute curve in its cutting operation.

It is another object of the invention to provide a machine suitable for cutting gears with an involute form with a milling type device but also adaptable to be replaced with a grinding stone to provide a finished cut on the said involute curves of the gear tooth.

Other objects and advantages of the invention will in part be obvious and in part appear hereinafter.

The invention is based upon the basic mathematical theory of developing an involute curve. That is, to have the tool cutter rotating in cutting relationship to a section of metal cutting gear teeth, therein but having its cutting circumference trace a pure involute curve by following such a curve. Commonly, in mathematical demonstrations, the involute is traced by moving a pencil point under uniform tension, attached to a string which is wrapped around a guide cylinder. In substantially the same fashion, the invention in this case involves providing a cylinder, a strap wrapped around the cylinder and a cutting tool held in proper tension relationship to said cylinder so that it can be moved in an involute path, thereby to cause the cutting tool to move on an involute path in appropriate relationship to a work-piece held in longitudinal alignment with the guide cylinder. Further means are provided for guiding the cutting tool to and from the work-piece. The invention will be better understood by reference to the drawings herein, in which:

FIGURE 2 is a cross-section taken along the line 2—2 of FIGURE 1.

FIGURE 3 is a detailed view of the cutting device in engaged position cutting a gear tooth.

Figure 1:
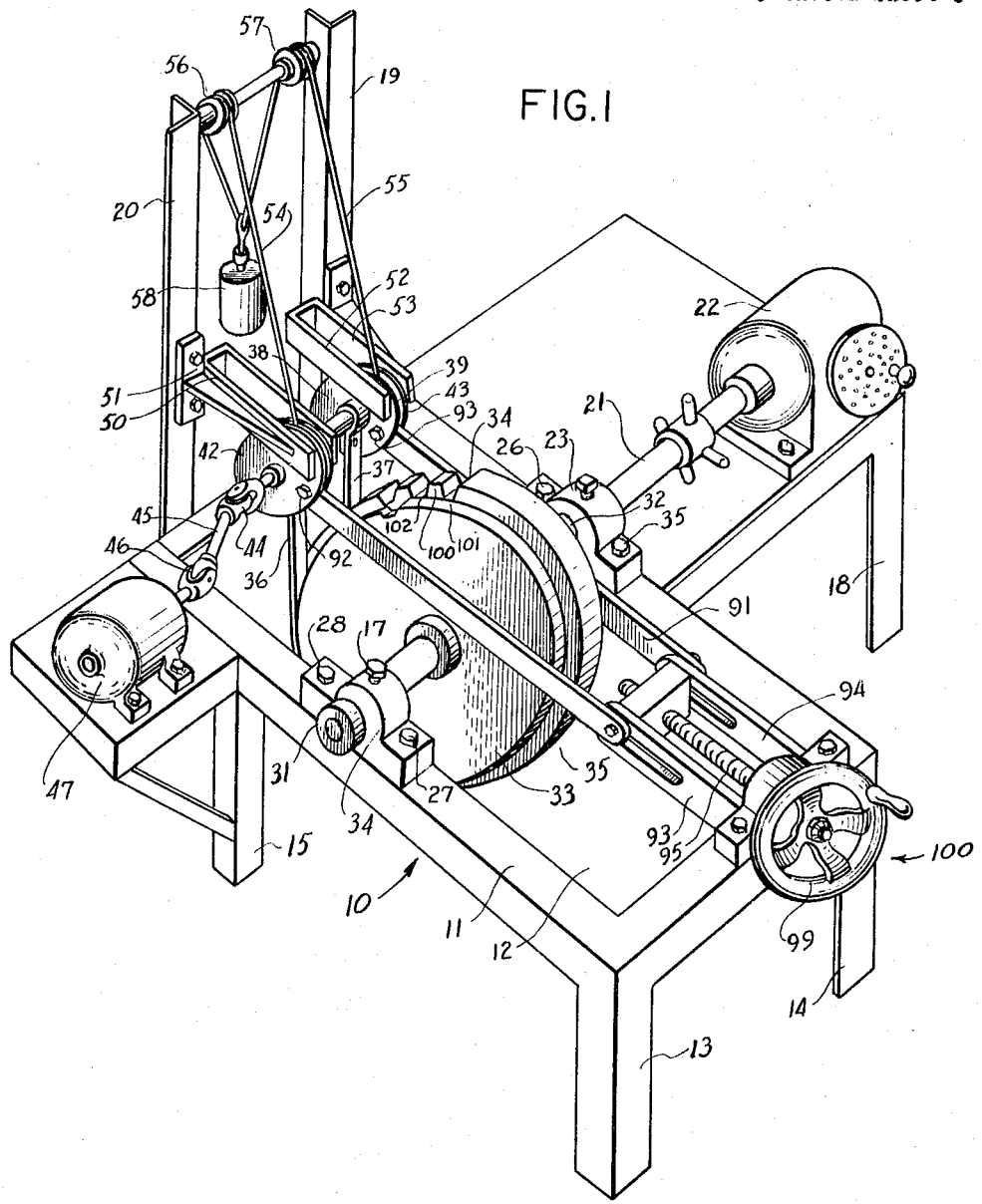
FIGURE 1 is an overall pictorial representation of the device.

FIGURE 1 is a comprehensive perspective view showing how the involute curve for the gear teeth is developed by means of the apparatus of this invention. Referring to the drawing, 10 represents the machine in general in which a table 11, having an opening 12, is supported on legs 13, 14, 15, 16, 17, 18, and a frame-work 19–20 is carried. Spanning the opening in the table is the shaft 21 connected to indexing unit 22, controlled by means of indexer 22. The shaft 20 passes through bearings 23 and 24 which are mounted on opposite sides of the table, which bearings can be opened by means of nuts 25–26–27–28–29–30, and hold hollow shaft 31–32 in place. Hollow shaft 31–32 carries matched disks 33–34 between which a work-piece 35, or gear to be cut, is carried by the index shaft.

Fastened to the disks 33 and 34 are circumferential straps 36 and 37 which terminate in circular bearings 38 and 39. The straps are fastened to the disks in any desired manner at points substantially beyond their points of tangency. Through the bearings runs the work-shaft 40 carrying a cutter or grinder 41. Shaft 38 is mounted in bearing units 42 and 43, so that shaft bearing units, bearings for straps and cutter form continuous assembly. Through shaft 38, universal joint 44, shaft 45 and joint 46, the cutter is connected to the driving motor 47. The bearings for the cutter are held and the shaft is guided by parallel guide bars 50, 51, 52, and 53 which are mounted in parallel and secured to the vertical posts 19 and 20. The straps 36 and 37 are held under uniform tension by means of the cords 54 and 55 which pass from the axis of the drive shaft over the pulleys 56 and 57 and are held in uniform tension by the weight 58.

For indexing the driven cutter to and from the work-piece, I provide a mechanical means for moving the cutter on an involute locus which means consists of rods 90 and 91 mounted at 92 and 93 respectively in the bearing assembly, the rods being carried forward to the operator's station 100, where they are engaged by feeding unit 93–94, which is mounted on feeding thread 95 driven by handle 96, thereby permitting controlled guided feeding of the cutter to and from the work-piece.

It will be apparent from the structure that the device is a mechanical means for moving the rotating cutter or grinder in an involute curve so that the edge of the cutter traces an involute as its locus. The definition of an involute is of course the locus of a point travelling in a path traced by unwinding a circumference of a circle under uniform tension.

By means of this device, it will be seen that the face of the gear tooth 100, 101, 102 is a true involute form.

This will be more apparent in FIGURE 3 where the diagram shows more clearly the details of the bearing assembly and the application of uniform tension to the cords and the strap which is wrapped around the work-piece. Under this arrangement where the work-piece is held stationary, the involute is traced.

For indexing from one tooth to the next, reference to FIGURE 2 will be instructive. Here, it will be seen that the shaft 7 passes centrally through the horizontal hollow shaft 31–32 bearing and is keyed to the central work-piece 35 from which the gear is being formed. That is, the work-piece 35 is keyed to the shaft 7 at point 6 and is held in a particular position by indexing unit 8. Upon completion of the gear tooth, the piece is advanced the appropriate number of degrees depending upon the pitch angle of the tooth and, thereafter, the cutter is advanced in position to perform its cutting operation.

These cuttings are repeated actions until all of one side of gear teeth are cut. Then the direction of the gear (work) is turned and these actions repeated. The gear grinding will be performed by exchanging the cutter with grinding stone.

In cutting, the teeth and changing the side of the gear teeth to be cut after one side has been, the following mathematical description is useful. This will be explained hereafter.

First of all we set the cutter to position "B" and then take out the cutter only from the cutter holder and next the index head must be rotated by amount of $\pi$.

(1)
$$\pi = \frac{\text{Pitch angle}}{2} + 2\phi \text{ angle subtended by cutter dia.}$$

(2)
$$\text{Pitch angle} = \frac{360°}{\text{No. of teeth}}$$

(3)
$$\phi = \sqrt{\frac{p^2}{a^2} - 1} - \arctan \sqrt{\frac{p^2}{a^2} - 1}$$

Figure 4:
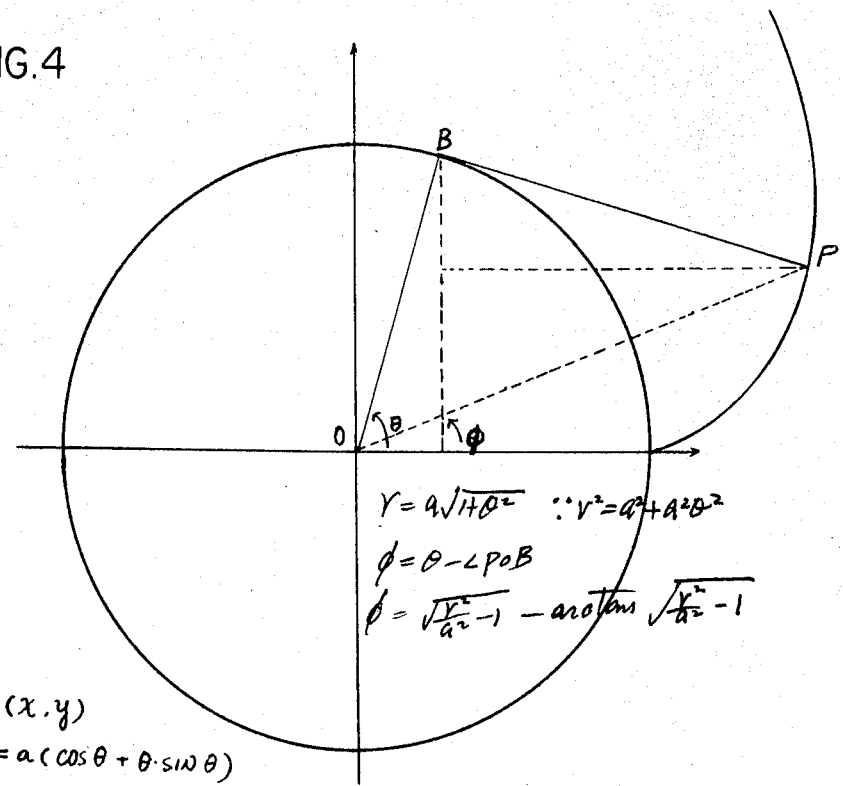
FIGURES 4 and 5 are geometric diagrams illustrating the mathematical relationships demonstrating the validity of the operation.

Formula 3 could be verified by FIGURE 4.
From rectangular coordinates:

(4) $\quad x = a(\cos\theta + \theta \sin\theta)$ (5) $\quad y = a(\sin\theta - \theta \cos\theta)$ From polar coordinates:

(6)
$$r = a\sqrt{1+\theta^2} \theta^2 = \frac{r^2}{a^2}\gamma \therefore \theta = \sqrt{\frac{r^2}{a^2} - 1}$$

(7)
$$\phi = \theta - \angle POB \therefore \tan \angle POB \frac{\overline{BP}}{a} = \frac{a\theta}{a} = \theta$$

$$\therefore \angle POB = \arctan \theta$$

(8)
$$\phi = \sqrt{\frac{r^2}{a^2} - 1} - \arctan \sqrt{\frac{r^2}{a^2} - 1}$$

Substituting P(radius of pitch circle) to $r$ in Formula 8, then we get Formula 3 from Formula 8.

(3)
$$\phi = \sqrt{\frac{p^2}{a^2} - 1} - \arctan \sqrt{\frac{p^2}{a^2} - 1}$$

When a pair of gears, that is, gear and pinion, is to be designed, the center distance and velocity ratio are given, and eventually pitch point and pitch circle are figured out.

If pitch circle was given, the pressure angle is dependent upon the base circle size, vice versa, and the bigger the pressure angle is, the smaller the base circle is, v.v.

This machine tool is not restricted by the pressure angle by interchanging the size of the base circle plate, though the old machine tools are restricted by the pressure angle, say, 14½° and 20°.

In a gear tooth, the involute curve starts from the base circle and ends on the addendum circle.

So the ideal gear and pinion is that the addendum of gear is the same as dedendum of the pinion and the addendum of the pinion is the same as the dedendum of the gear in order to make better contact without noise, though the old machine tool cutter has same addendum and dedendum in the most case, especially interchangeable gears.

In other words, this invention can machine gears having both same addendum and dedendum and different dedendum and addendum.

The base circle plate must be changed whenever the size of gear is changing, and the pressure angle on a same gear is changing itself.

Figure 5:
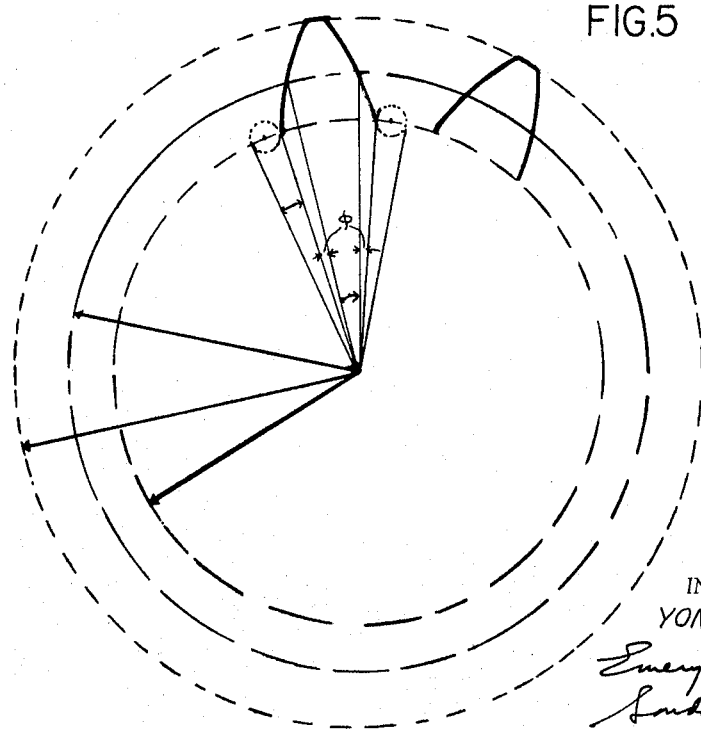

This machine tool also could control the size of the back lash by changing the angle (FIGURE 5).

What is claimed is:

1. A device for guiding a tool in an involute path which comprises, in combination, support means carrying an index shaft and indexing means connected thereto for controlling the angular position of said shaft, a pair of guide cylinders mounted on said shaft, means for locking a work-piece between said guide cylinders in position for application of a tool, flexible means attached to each of said cylinders, each of said flexible means making tangential contact with each of said cylinders, each of said flexible means carrying a bearing at the free end thereof, a shaft in said bearings held parallel to said index shaft, a cutting tool secured to said shaft for rotation therewith, a tension means extending from each end of said shaft having uniform tension applied thereto, driving means for rotating said shaft and said tool and feed means for moving said tool into and out of contact with a workpiece mounted in place.

2. A device in accordance with claim 1 wherein said tension means is a weight.

3. A device in accordance with claim 1 wherein the tool is a gear cutter which is shaped round.

4. A device in accordance with claim 1 wherein the tool is a round grinding stone.

5. A device in accordance with claim 1 wherein said cylinders are on a hollow shaft and adapted to receive the workpiece therebetween.

References Cited by the Examiner
UNITED STATES PATENTS

| | | | |
|---|---|---|---|
| 1,479,144 | 1/1924 | Lofquist | 90—3 X |
| 2,136,266 | 11/1938 | Reinecker | 90—3 X |

WILLIAM W. DYER, Jr., *Primary Examiner.*

L. VLACHOS, *Assistant Examiner.*